A. J. PETERSON.
SELF FEEDER FOR THRESHING MACHINES.
APPLICATION FILED DEC. 20, 1911. RENEWED AUG. 17, 1914.
1,132,731.
Patented Mar. 23, 1915.
3 SHEETS—SHEET 1.
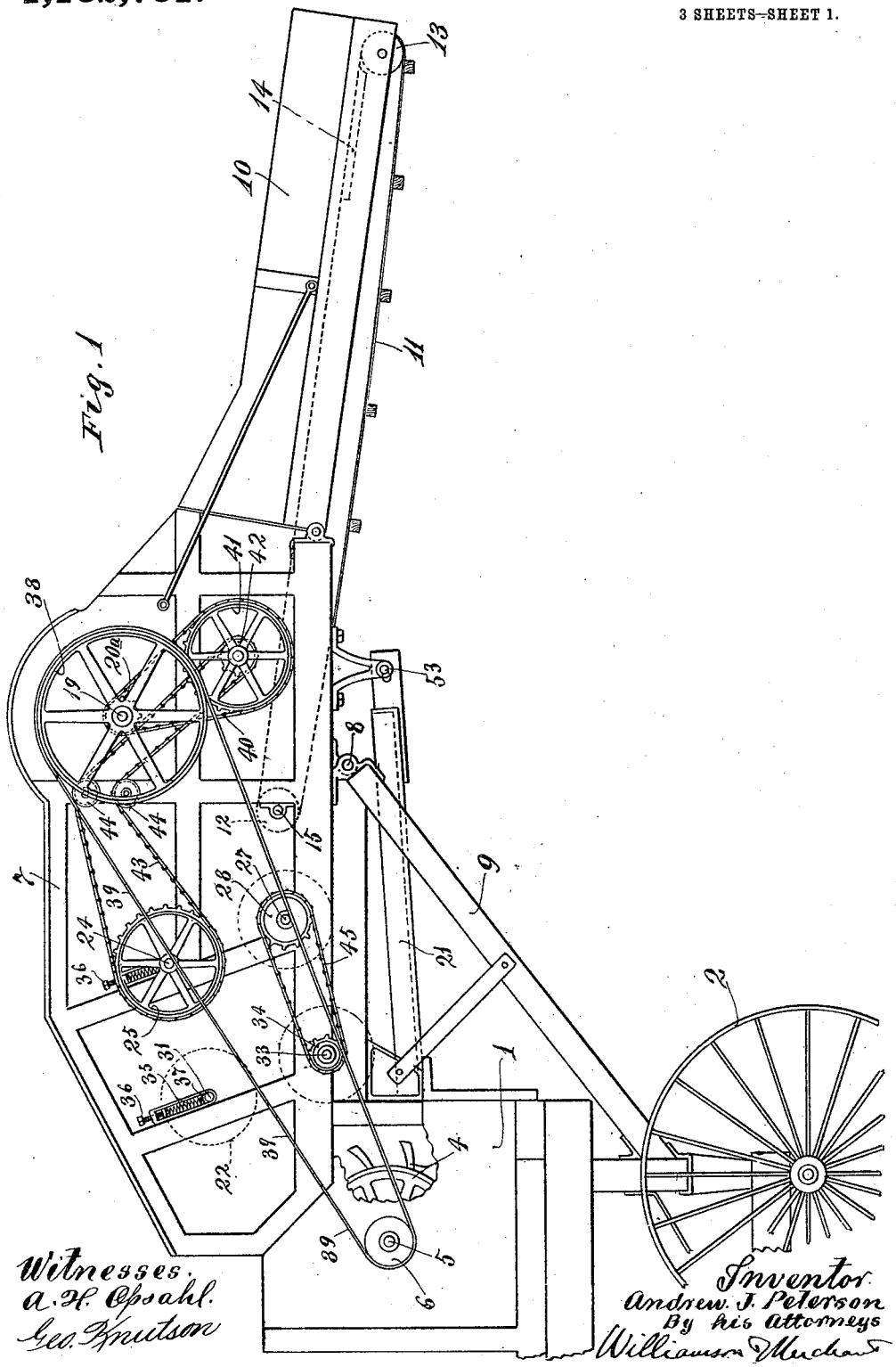
Witnesses.
a. H. Opsahl.
Geo. Knutson.
Inventor
Andrew J. Peterson
By his Attorneys
Williamson Merchant A. J. PETERSON.
SELF FEEDER FOR THRESHING MACHINES.
APPLICATION FILED DEC. 20, 1911. RENEWED AUG. 17, 1914.
1,132,731.
Patented Mar. 23, 1915.
3 SHEETS—SHEET 2.
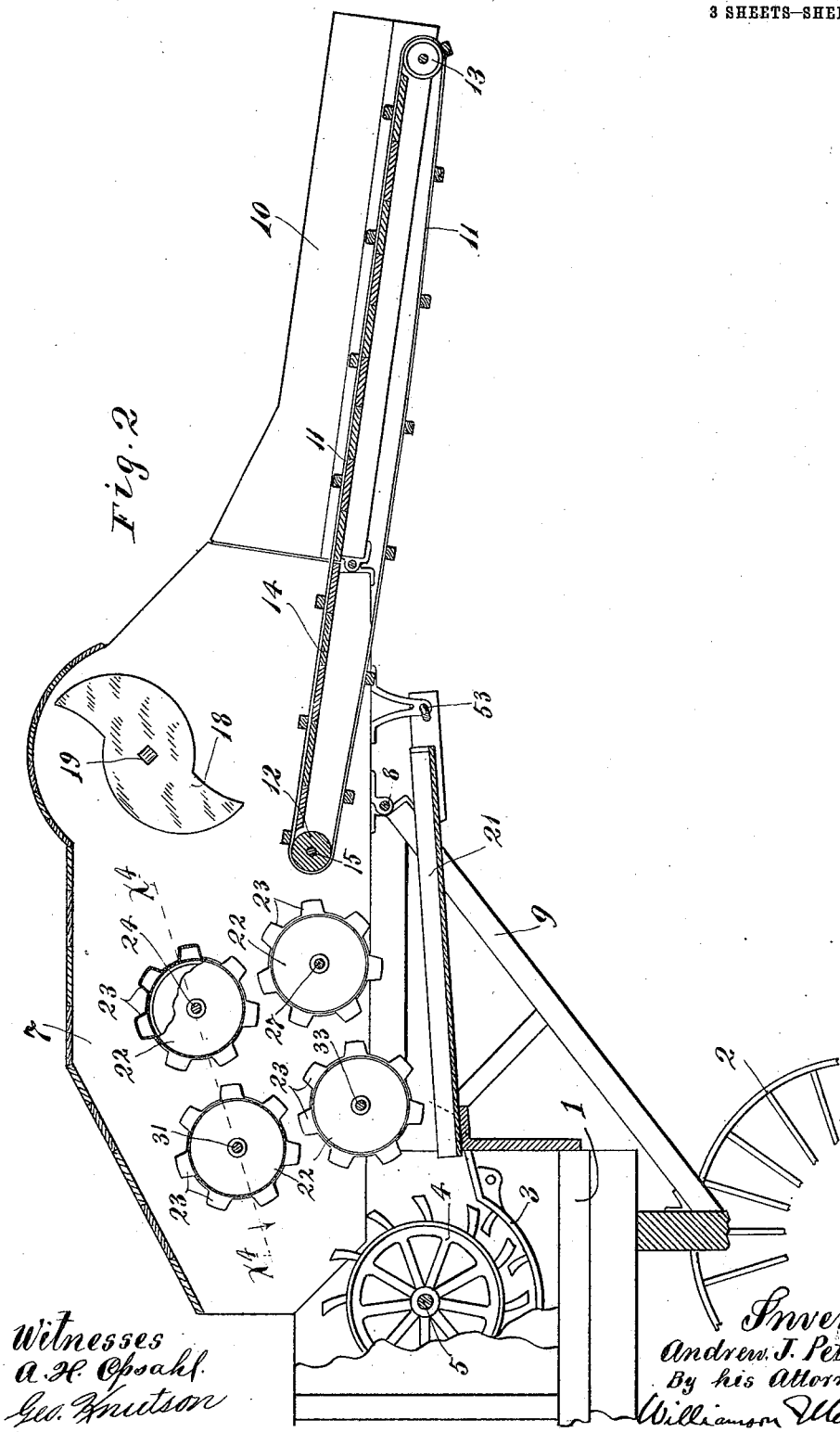

A. J. PETERSON.
SELF FEEDER FOR THRESHING MACHINES.
APPLICATION FILED DEC. 20, 1911. RENEWED AUG. 17, 1914.
1,132,731.
Patented Mar. 23, 1915.
3 SHEETS—SHEET 3.
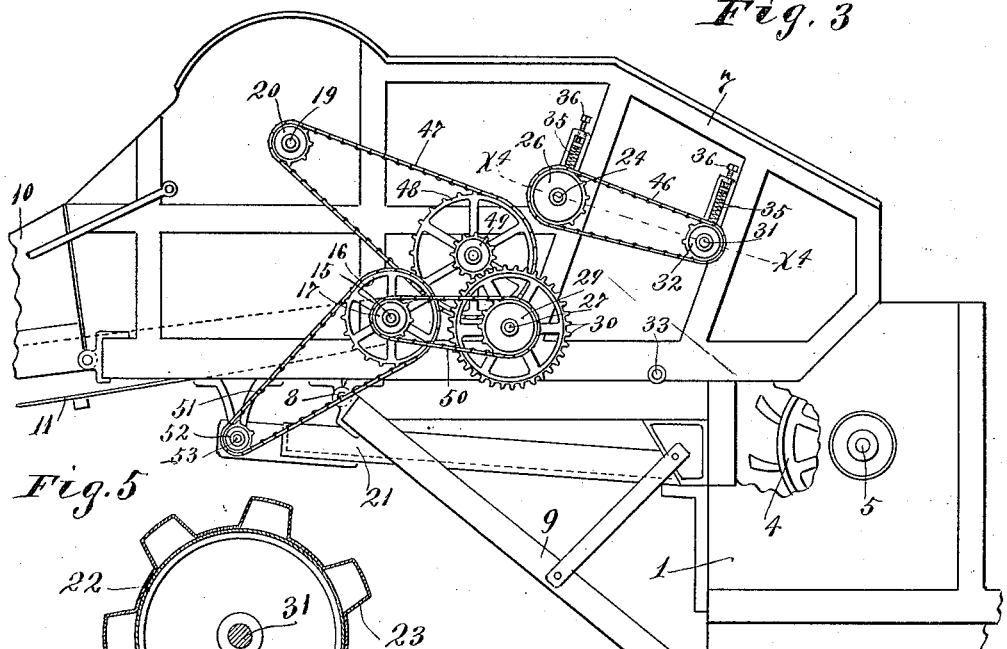
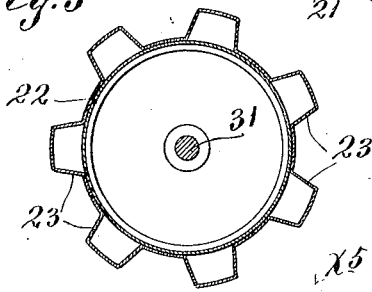
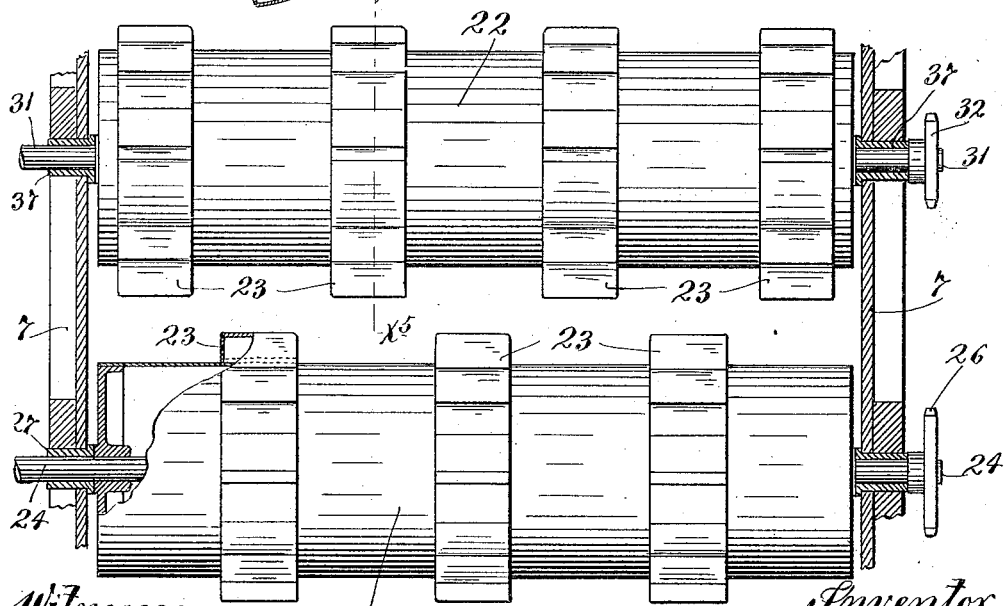
Witnesses
A. H. Opsahl.
Geo. Knutson.
Inventor.
Andrew J Peterson
By his Attorneys
Williamson Merchant

UNITED STATES PATENT OFFICE.

ANDREW J. PETERSON, OF ISANTI, MINNESOTA.

SELF-FEEDER FOR THRESHING-MACHINES.

1,132,731.

Specification of Letters Patent.

Patented Mar. 23, 1915.

Application filed December 20, 1911, Serial No. 666,878. Renewed August 17, 1914. Serial No. 857,264.

*To all whom it may concern:*

Be it known that I, ANDREW J. PETERSON, a citizen of the United States, residing at Isanti, in the county of Isanti and State of Minnesota, have invented certain new and useful Improvements in Self-Feeders for Threshing-Machines; and I do hereby declare the following to be a full, clear, and exact description of the invention, such as will enable others skilled in the art to which it appertains to make and use the same.

My invention has for its object to provide an improved band cutter and feeder for threshing machines, and the invention is directed particularly to an improved arrangement of feed rollers located between the band cutters and the threshing cylinders, and serving to spread out and evenly distribute the grain after the bands have been cut, and to thereby produce an even and uniform delivery of the grain to the threshing cylinder and concave.

Generally stated, the invention consists of the novel devices and combinations of devices hereinafter described and defined in the claims.

In the accompanying drawings which illustrate the invention, like characters indicate like parts throughout the several views.

Referring to the drawings: Figure 1 is a view in left side elevation showing the improved band cutter and feeder applied to a threshing machine, some parts being broken away. Fig. 2 is a vertical section of the parts shown in Fig. 1; Fig. 3 is a right side elevation of the parts shown in Fig. 1, portions being broken away; Fig. 4 is a view partly in plan and partly in section on the line $x^4$ $x^4$ of Figs. 2 and 3, and Fig. 5 is a section taken on the line $x^5$ $x^5$ of Fig. 4.

Of the parts of the threshing machine shown, the numeral 1 indicates the machine case, the numeral 2 the front wheels, the numeral 3 the threshing concave, and the numeral 4 the threshing cylinder, which latter is secured on the usual shaft 5 provided with a pulley 6 at one end.

The numeral 7 indicates the usual hood of the band cutter and feeder the same being preferably pivoted at 8.

9 indicates the braced frame work rigidly secured to the front end of the machine case and frame work.

The hood 7 has the usual hinged extension 10. The bundle feeding belt 11 runs over rollers 12 and 13 journaled respectively in the hood 7 and to the outer end of the hinged section 10. Also the said feed belt 11 runs over a deck 14 made up of two sections, one of the sections being secured to the hood and the other to the said hinged section 10. The inner roller 12 is secured on a shaft 15 extended through the sides of the hood 7 and provided at one end with a large sprocket wheel 16 and a smaller sprocket wheel 17. (See Fig. 3).

The blades 18 of the band cutter are preferably of the usual form and are secured in the customary way to a shaft 19 journaled in the sides of the hood 7 and provided at one end with a sprocket wheel 20, and at its other end with a sprocket wheel $20^a$. This band cutter works directly over the delivery portion of the feed belt 11.

An inclined grain deck 21 extends from a point below the delivery portion of the belt 11 to the threshing concave 3. Working in the space above the feed deck 21 in front of the threshing cylinder and in the rear of the band cutter and the delivery portion of the feed belt are a plurality (preferably two pairs) of distributing rollers of novel construction and relative arrangement. These distributing rollers 22 are preferably made from sheet metal, but may be otherwise formed. They are arranged in coöperating pairs with one member of each pair above the other member so that the loose grain or cut bundles will pass between the same. Each roller is provided with longitudinally spaced or laterally off-set toothed or lug equipped rims or sections 23 which not only increase the feeding efficiency of the rollers, but operate to spread out and laterally distribute the loose bundles. These teeth or lugs 23 constitute longitudinally spaced diametrically increased sections on the rollers 22. To further increase this action, the toothed portions 23 of the outer rollers are laterally set out of line with the toothed portions of the inner rollers so that they oppose smooth or toothless portions of the coöperating rollers. (See particularly Fig. 4). The toothed portions 23 of the outer pair of rollers are in the same vertical planes with each other and the toothed portions 23 of the inner pair of rollers are in the same plane with each other, but as is obvious in planes off-set from the vertical planes of the toothed portions of the said outer pair of rollers. This relative arrangement of the toothed portions of the said rollers is highly important, as will more fully appear in the description of the operation. The upper roller 22 of the outer pair has a shaft 24 journaled in the sides of the hood 7 and provided at one end with a large sprocket 25 (see Fig. 1) and at its other end with a sprocket 26 (see Fig. 3). The lower roller 22 of the outer pair has a shaft 27 journaled in the sides of the hood 7 and provided at one end with a sprocket 28 (see Fig. 1) and at its other end with a sprocket 29 and a gear 30, (see Fig. 3). The upper roller 22 of the inner pair has a shaft 31 journaled in the sides of the hood 7 and provided at one end with a sprocket 32 (see Fig. 3). The lower roller 22 of the inner pair has a shaft 33 journaled in the sides of the hood 7 and provided at one end with a sprocket 34 (see Fig. 1).

The upper rollers 22 are vertically movable in respect to the lower rollers 22 and are preferably spring pressed downward by suitable springs 35 made adjustable by set screws 36 and, hence, the upper roller shafts 24 and 31 are directly journaled in bearings 37 mounted for vertical movements in suitable slots or seats formed in the sides of the hood 7. Preferably, also, the teeth of coöperating upper and lower rollers 22 are so set that they may intermesh with each other when the upper rollers are dropped to their lowest possible positions. This will increase the certainty or positiveness of the feeding action of the said rollers, because the teeth, with this arrangement, will kink the grain and get a better hold thereon.

On that end of the band cutter shaft 19 to which the small sprocket 20ᵃ is secured, a large pulley 38 is also secured. A belt 39 runs over said large pulley 38 and is driven by the pulley 6 on the shaft 5 of the threshing cylinder. The said threshing cylinder will be driven in the usual well known way. A sprocket chain 40 runs over the sprocket 20ᵃ and over a large reducing sprocket 41 journaled to the adjacent side of the hood 7 and carrying a small sprocket 42 on its hub. A sprocket chain 43 runs over the said sprocket 42 over the larger sprocket 25 on the shaft 24 of the upper outer roller 22. Said chain 43 also runs over idle guide wheels 44 journaled on the adjacent side of the hood 7 (see Fig. 1). A sprocket chain 45 runs over the sprockets 28 and 34 on the shafts of the lower rollers 22.

Referring to Fig. 3, it will be noted that a sprocket chain 46 runs over the sprockets 26 and 32 on the shafts of the two upper rollers 22. A sprocket chain 47 runs over the sprocket 20 on the band cutter shaft 19, and over a large reducing sprocket 48 journaled on the adjacent side of the hood 7 and carrying on its hub a spur pinion 49 that meshes with the gear 30 which is on the shaft 27 of the outer lower rollers 22. A sprocket chain 50 runs over the sprockets 29 and 17 which are on the roller shafts 27 and 15 respectively. A sprocket chain 51 runs over the sprocket 16 of the shaft 15 and over a sprocket 52 which, through a suitable crank shaft 53 (see Fig. 2), serves to vibrate the deck 21 in the usual way.

The operation of the said belt 11, of the band cutter 18 and of the threshing cylinder are all so well known that detail description thereof is not necessary.

As all persons familiar with the operation of threshing machines well know, there is a tendency for the grain to accumulate in bunches after the bundles have been cut and thereby choke the threshing cylinder and concave. This tendency is increased in wet grain and is also due largely to uneven feeding of the bundles; but even when the bundles are supplied in an even order of succession, each cut bundle will form a bunch which tends to pass at once to the threshing cylinder. In actual practice, I have found that my improved arrangement of the so-called distributing rollers will prevent clogging of the cylinder, and will serve to evenly distribute and feed the cut bundles to the threshing cylinder. This action is due, as already indicated in part, to the relative arrangement of the toothed and relatively smooth portions on the said distributing rollers. To illustrate more fully, attention is called to the fact that when a bunch or over accumulation of loose grain is brought into contact with the outer pair of distributing rollers, the toothed portions of the latter will tend to spread out the grain, but will insure immediate delivery thereof against the second or inner pair of toothed distributing rollers. This inner pair of toothed rollers are driven at considerably higher speed than the said outer pair of rollers (because the sprocket 32 is smaller than the sprocket 36) and hence the grain engaged by the toothed portions of the said inner rollers will more rapidly feed toward the threshing cylinder the grain caught thereby and which is held only between the smooth portions of the outer pair of rollers. The grain which is still held by the toothed portions of the relatively slow outer distributing rollers will be retarded and, furthermore, the smooth portions of the faster moving inner rollers will have much less feeding efficiency. In this way, it is evident that a bunch of grain in passing between the two parts of distributing rollers will be first spread out and then separated by movement of portions thereof to the threshing cylinder more rapidly than other portions thereof. This produces the desired uniform delivery of the grain to the threshing cylinder and avoids all clogging thereof even when the grain is wet. Also the inner pair of distributing rollers serve to hold back and prevent grain engaged by the teeth of the threshing cylinder from being instantly drawn into the toothed concave, so that the said threshing cylinder has a sort of combing or carding action on the grain before it has reached the concave. From this it also follows that considerable threshing will be done just before the grain reaches the concave.

What I claim is:

1. The combination with the threshing cylinder of a threshing machine, of bundle feeding and band cutting dwevices, and a multiplicity of pairs of upper and lower distributing rollers having longitudinally spaced diametrically increased sections, the diametrically increased sections of the upper and lower rollers being located in the same vertical planes, and the diametrically increased sections of the inner and outer pair of rollers being laterally off-set at different vertical planes.

2. The combination with the threshing cylinder, of a threshing machine, of bundle feeding and band cutting devices, and a multiplicity of pairs of upper and lower distributing rollers having longitudinally spaced diametrically increased sections formed by circumferentially spaced teeth, the diametrically increased sections of the upper and lower rollers being located in the same vertical planes, and the diametrically increased sections of the inner and outer pair of rollers being laterally off-set at different vertical planes.

In testimony whereof I affix my signature in presence of two witnesses.

ANDREW J. PETERSON.

Witnesses:
H. J. PETERSON,
T. C. BLOMGRAN.

Copies of this patent may be obtained for five cents each, by addressing the "Commissioner of Patents, Washington, D. C."